Nov. 9, 1965　　　W. C. ARNOLD　　　3,217,140
AUTOMATIC ACCUMULATING MEANS FOR ACCOUNTING MACHINES
Filed Dec. 15, 1960　　　3 Sheets-Sheet 1

INVENTOR
WILLIAM C. ARNOLD

BY
Louis A. Kline
Albert L. Sessler, Jr.
HIS ATTORNEYS

Nov. 9, 1965                W. C. ARNOLD                3,217,140
           AUTOMATIC ACCUMULATING MEANS FOR ACCOUNTING MACHINES
Filed Dec. 15, 1960                          3 Sheets-Sheet 2
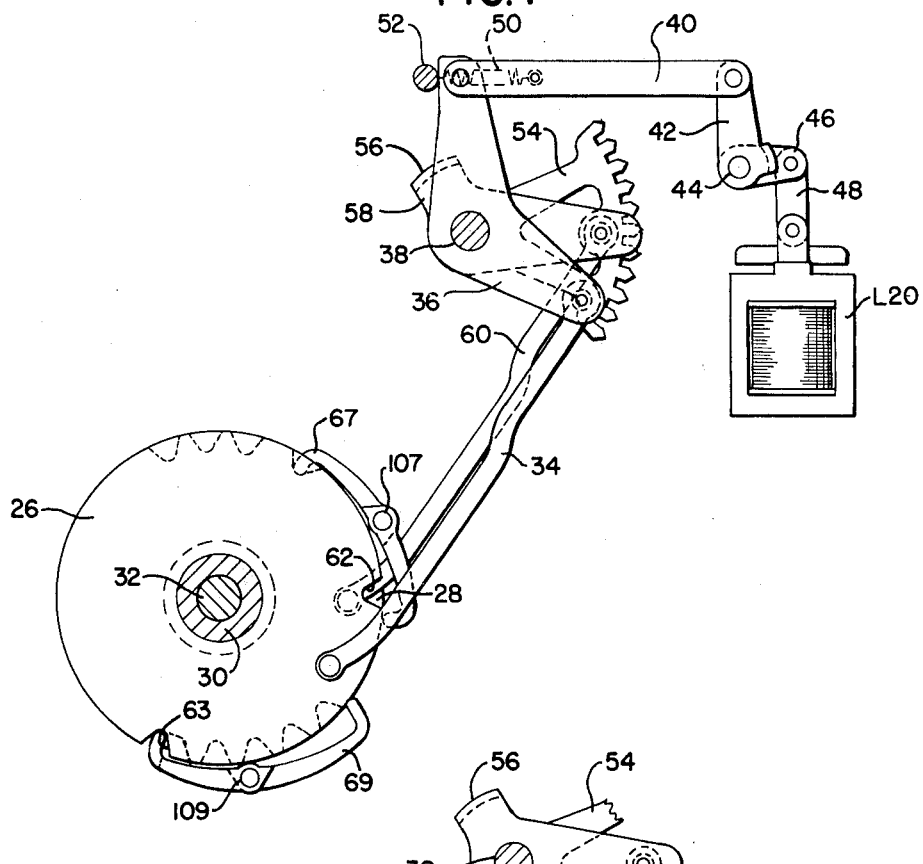
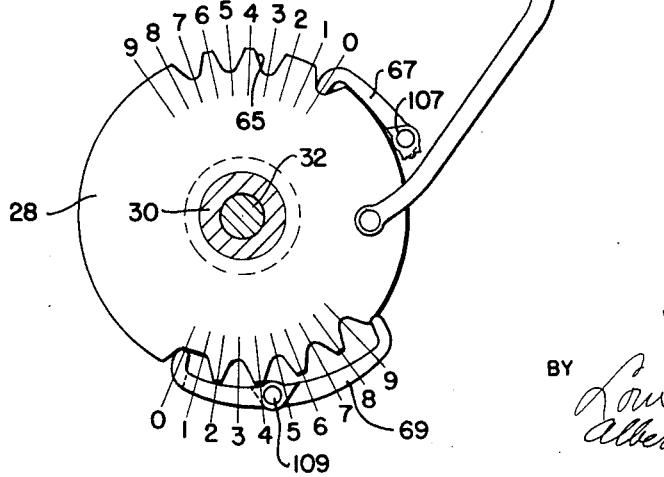
INVENTOR
WILLIAM C. ARNOLD
BY Louis A. Kline
   Albert L. Sessler, Jr.
           HIS ATTORNEYS

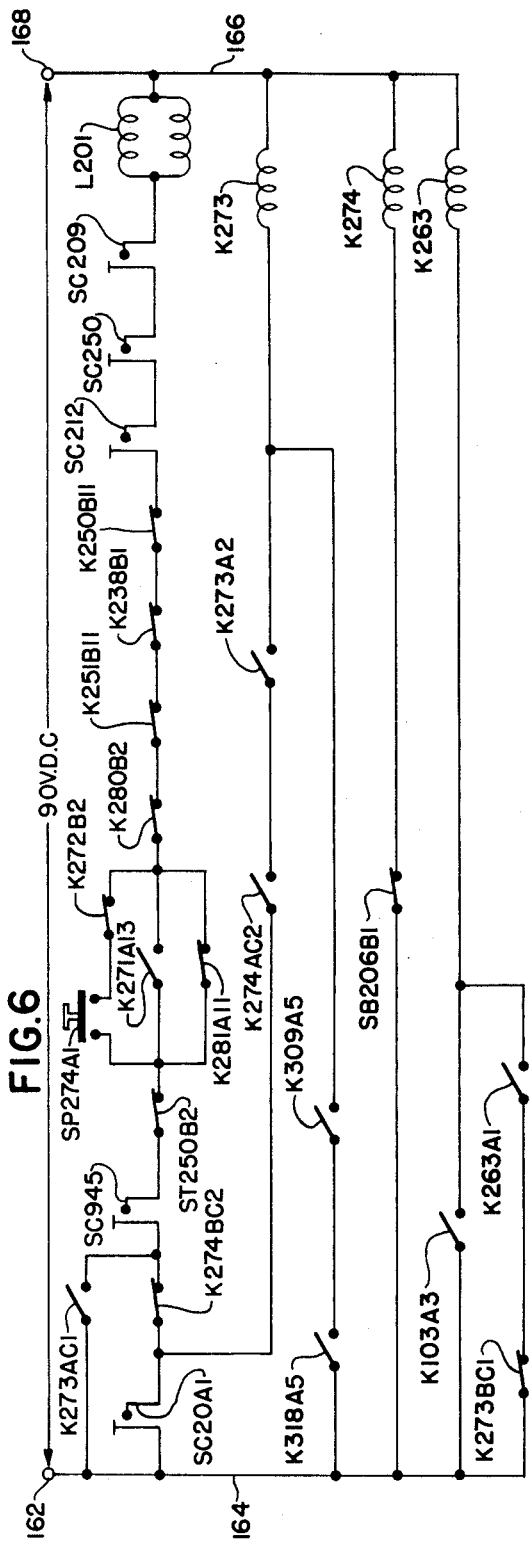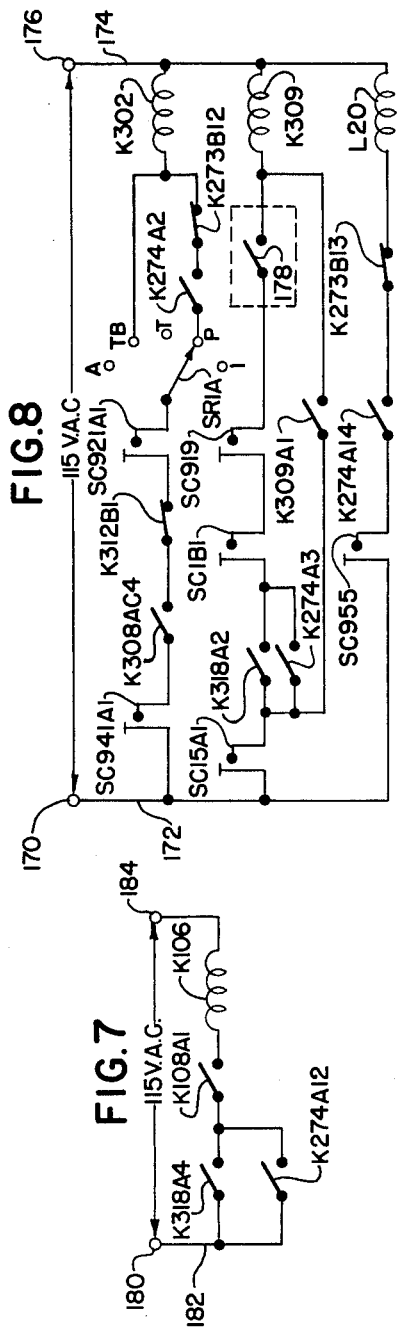

United States Patent Office 3,217,140
Patented Nov. 9, 1965

3,217,140
AUTOMATIC ACCUMULATING MEANS FOR
ACCOUNTING MACHINES
William C. Arnold, Dayton, Ohio, assignor to The National Cash Register Company, Dayton, Ohio, a corporation of Maryland
Filed Dec. 15, 1960, Ser. No. 75,987
7 Claims. (Cl. 235—61.7)

This invention relates to automatic operating means for accounting machines, and more particularly relates to means for effecting an automatic trial balance of a group of accounts at the same time that posting of item entries is being accomplished automatically on the same group of accounts.

The present invention is particularly adapted for use with an accounting apparatus of the type disclosed in the co-pending United States patent application Serial No. 840,701, filed September 17, 1959, by William C. Arnold and Chester N. Jorgensen, now United States Patent No. 3,102,950, issued September 3, 1963, although it is not necessarily limited to such use. Briefly, that apparatus provides means capable of sensing data from a first record medium, such as perforated paper tape, and controlling an accounting machine and a feeding device to cause the input of such sensed data into the accounting machine according to a predetermined arrangement. The accounting machine may be of the type disclosed in the United States Patent No. 2,947,475, issued August 2, 1960, to Konrad Rauch et al., and the feeding device may be of the type disclosed in the co-pending United States patent application Serial No. 770,673, filed October 30, 1958, by Henry Grosnickle, Jr., and William C. Arnold, inventors, now United States Patent No. 3,079,145, issued February 26, 1963.

The data sensed from the first record medium may include amount information, such as checks and deposits, to be added to or substracted from the balance of a particular account; identification information, such as an account number, to insure that the amount information is entered on the correct account; and control information pertaining to the type of transaction, such as check or deposit, and also including a signal for initiation of operation of the accounting machine. Solenoid-operated means are provided in association with the keyboard of the accounting machine for operation of the various keys, and are energized according to the signals sensed from the tape to effect entry of the information into the accounting machine.

The old balance for each account, as well as account identification data and other information, is obtained from a second record medium in the form of a magnetically encoded account ledger card. These ledger cards are fed by the feeding device into the accounting machine, where a legible record of the posting operation for the particular account is printed on each card.

Various interlocks and control circuits interconnect the accounting machine, the sensing device, and the feeding device, to insure operation of all of these mechanisms in the proper sequence, and to prevent the entry of erroneous information.

The present invention adds to the above apparatus the capability of providing a trial balance total during the posting of a given group of accounts, by adding the balance of each account into one of the totalizers of the accounting machine. In the case of an "active" account, in which additional entries are posted during the posting run, a new balance is taken at the conclusion of posting to that account and is added into the trial balance totalizer. In the case of an "inactive" account, on which no posting entries are made during the posting run, the old balance of the account is immediately entered into the trial balance totalizer.

In order to accomplish this, means are provided to distinguish between "active" and "inactive" accounts, and are utilized to control the totalizer-engaging mechanism of the accounting machine. These means include a solenoid which is energized over a circuit including contacts controlled by the comparison means disclosed in the previously-mentioned United States patent application Serial No. 840,701, for comparing the identification data on the two different types of record media. The totalizer control means also include a totalizer-selecting plate set by said solenoid and operable to control the totalizer engaging means to determine into which totalizer the balance is to be added. Means are also provided to coordinate the operation of the accounting machine with the tape-sensing means and the feeding device, to insure a proper sequence of operation while the trial balance is being accumulated during the posting run.

Accordingly, an object of the present invention is to provide means to enable a machine capable of automatic posting to a group of accounts to take a trial balance of all accounts of the group during a posting run, even though some of said accounts may not have any new entries during that run.

Another object is to provide means to enable a machine capable of automatic posting to a group of accounts to take a simultaneous trial balance of all accounts, said means including mechanism to cause the balance from inactive accounts to be entered immediately into a trial balance totalizer, while the balance from each active account is entered first into another totalizer, and the item entries pertaining to that account are posted, after which the new balance for that account is transferred to the trial balance totalizer.

A further object is to provide a control responsive to the condition of whether or not there is agreement between account identification information and item identification information, said control being utilized for setting of a totalizer-engaging mechanism, to cause one totalizer to be engaged in the event of agreement of identification information, and to cause a different totalizer to be engaged in the event of failure of agreement of identification information.

An additional object is to provide a control circuit capable of energizing a solenoid when proper comparison is effected, in combination with a selecting plate which is sensed to control the selective engagement of a plurality of totalizers, in the machine being controlled, and which is set by the solenoid when the solenoid is energized.

With these and other objects, which will become apparent from the following description, in view, the invention includes certain novel features of construction and combinations of parts, a preferred form or embodiment of which is hereinafter described with reference to the drawings which accompany and form a part of this specification.

In the drawings:

FIG. 4 is a detail view showing one of the selecting plates for controlling the totalizer-engaging means, the means for sensing said plate, and the means for positioning said plate.

FIG. 5 is a detail view similar to FIG. 4, showing a second selecting plate with its sensing and positioning mechanisms.

FIG. 6 is a circuit diagram showing a portion of the control circuitry associated with the tape-sensing means.

FIG. 7 is a circuit diagram showing a portion of the control circuitry, associated with the ledger card feeder.

FIG. 8 is a circuit diagram showing a portion of the control circuitry associated with the accounting machine.

Figure 1:
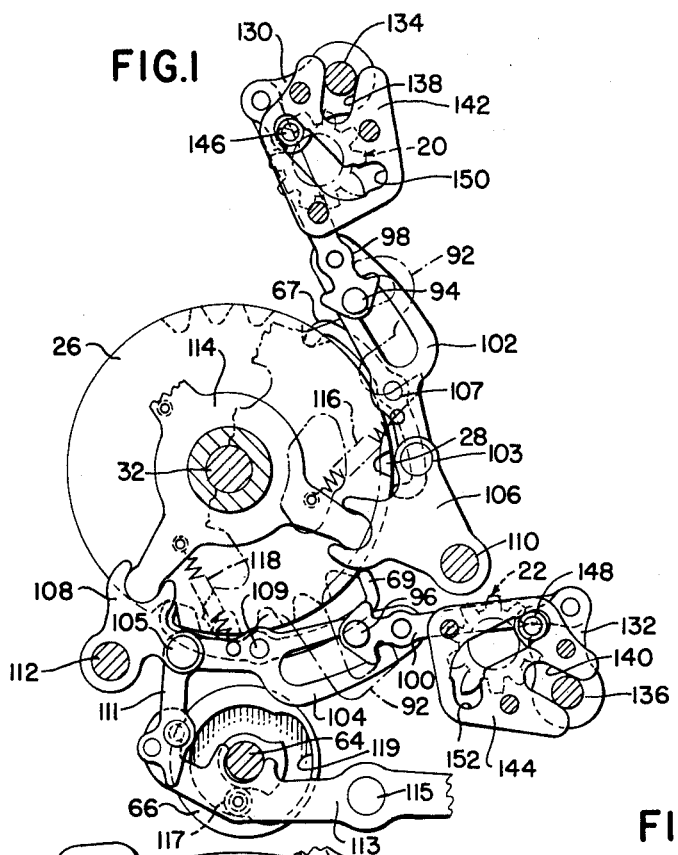
FIGS. 1 and 2 are partial detail views of the totalizer-engaging and -disengaging means which forms a part of the machine in which the present invention is embodied.
Figure 2:
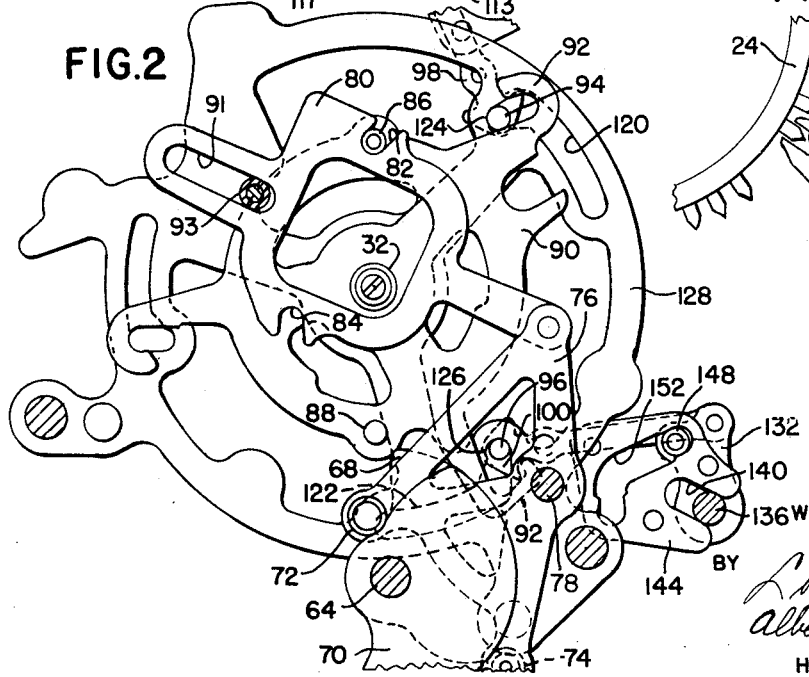
Figure 3:
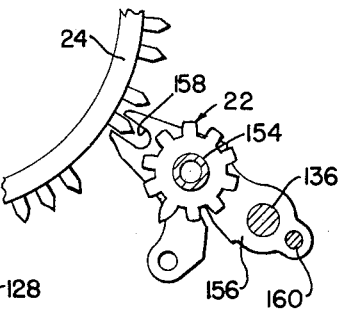
FIG. 3 is a fragmentary detail view showing one of the totalizer lines of the machine and a portion of the differential actuating mechanism which serves to enter information into the totalizers and extract the information therefrom.

The machine embodying this invention has two lines of totalizers, including an upper, or No. 1, totalizer line 20 (FIGS. 1 and 2), and a back, or No. 2, totalizer line 22 (FIGS. 1, 2, and 3). The No. 1 totalizer is a balance totalizer, often referred to as a "crossfooter," and comprises denominational sets of plus and minus wheels, said plus and minus wheels in each denominational order being reversely geared together, so that, when one wheel is turned in one direction, the other wheel turns in the opposite direction, and vice versa, as is well known in the art, and as fully described in the United States Patent to Bernis M. Shipley, No. 1,619,796. The calculation of new balances for individual accounts by accumulation of old balances, check entries, and deposit entries is accomplished in the balance totalizer of the No. 1 totalizer line. The trial balance totalizer of the No. 1 totalizer line accumulates plus and minus trial balance information by having added thereto new balances from active accounts and old balances from inactive accounts, as will be fully described.

The totalizers on the No. 1 and No. 2 totalizer lines are selectively engaged with differential actuators 24 during counter-clockwise movement of the actuators in adding and subtracting operations and during the clockwise movement of the actuators in the second cycle of total and sub-total operations, as fully described in the Bernis M. Shipley United States Patent No. 1,619,796.

Selective engagement of the totalizers of the No. 1 and No. 2 totalizer lines is accomplished by the totalizer-engaging mechanisms shown in FIGS. 1 and 2 under control of a pair of totalizer-selecting plates 26 and 28, shown in FIGS. 4 and 5, which are mounted on a hub 30 and a shaft 32 in the accounting machine.

Pivoted at one end to the plate 26 is a link 34, which is pivoted at its other end to one arm of a bell-crank 36, free on a shaft 38 in the machine framework. The other arm of the bell-crank 36 is connected by a link 40 to an arm 42 on a shaft 44. Also mounted on the shaft 44 and connected for unitary movement with the arm 42 is an arm 46, connected by a link 48 to the armature of a solenoid L20, fixed in the machine framework. A spring 50, connected at one end to the link 40 and at the other end to a stud 52 in the machine framework, exerts the force to maintain the plate 26, the link 34, the bell-crank 36, the link 40, the arms 42 and 46, and the link 48 in the position in which they are shown in FIG. 4, except when the solenoid L20 is energized.

Energization of the solenoid L20 acts through the link 48, the arms 46 and 42, the link 40, the bell-crank 36, and the link 34 to rock the selecting plate 26 clockwise, against the force of the spring 50.

Positioning of the plate 28 is controlled by the key selected in control row 2 of the accounting machine. The row 2 differential mechanism (not shown) is positioned according to the selected key, and this positioning is effective to set the row 2 indicator segment 54 (FIGS. 4 and 5) correspondingly, as described in the previously-mentioned United States Patent No. 2,947,475. Connected to the row 2 indicator segment 54 for unitary movement therewith by a yoke 56 is an arm 58, pivotally connected to one end of a link 60, the other end of which is pivotally connected to the selecting plate 28. Key selection in row 2 is thus effective, through the mechanism described above, to determine the setting of the plate 28.

The peripheries of the selecting plates 26 and 28 are provided with a plurality of notches, such as the notches 62 and 63 on the plate 26, and the various notches 65 on the plate 28. Arranged to sense the peripheries of the selecting plates 26 and 28 are a pair of selecting plate pawls 67 and 69, each having a pair of ends for this purpose. The selecting plate pawls 67 and 69 are pivotally mounted at 107 and 109 on levers 102 and 104 (FIGS. 1 and 2) of the totalizer-engaging mechanism.

Referring now to FIGS. 1 and 2, the construction of the totalizer-engaging mechanism, and the manner in which the plates 26 and 28 control the operation of said mechanism, will now be described.

Fixed to a main drive shaft 64 are a plurality of cams 66, 68, and 70, which operate the totalizer-engaging mechanism of FIGS. 1 and 2.

Cooperating with the peripheries of the cams 68 and 70 are a pair of rollers 72 and 74 on a bell-crank 76, which is rotatably mounted on a shaft 78 in the machine framework. Pivotally connected to one end of the bell-crank 76 is a link 80, having a central aperture; upper and lower notches 82 and 84, engageable with pins 86 and 88 on an engaging spider 90; and an elongated slot 91, in which rides a roller 93, which is positioned by mechanism (not shown) associated with control row 1 of the accounting machine. This mechanism acts through the roller 93 to position the link 80 so that the notch 82 is in engagement with the pin 86, as shown in FIG. 2, when the machine is to perform "add" transactions. When control row 1 is set to cause the machine to perform a "reset" transaction, the roller 93 positions the link 80 so that the lower notch 84 is in engagement with the pin 88. The manner in which row 1 controls the setting of the link 80 is fully described in the previously-mentioned United States Patent No. 1,619,796, to Bernis M. Shipley.

The spider 90 is rotatably mounted on the shaft 32 and is provided with a plurality of hooks 92 arranged to cooperate with studs 94 and 96, fixed on links 98 and 100, which are rotatably mounted on the levers 102 and 104, pivotally connected at 103 and 105 to bell-cranks 106 and 108, free on shafts 110 and 112, fixed in the machine framework. The bell-cranks 106 and 108 are provided with bifurcated portions to receive the ends of two of the arms of a three-armed lever 114, rotatably mounted on the shaft 32. Springs 116 and 118 are connected between two of the arms of the lever 114 and the bell-cranks 106 and 108, and urge the ends of the pawls 67 and 69, pivotally mounted on the levers 102 and 104, into engagement with the peripheries of the totalizer-selecting plates 26 and 28.

Also connected to the pivotal connection 105 between the lever 104 and the bell-crank 108 is one end of a link 111, the other end of which is pivotally connected to a cam follower 113, free on a shaft 115, having a roll 117, which rides in an internal raceway 119 in the cam 66.

The studs 94 and 96, fixed to one end of each of the links 98 and 100, ride in slots 120 and 122, each of which is provided at one end with a recess 124 and 126, respectively, in a plate 128, fixed in the machine framework. The other ends of the links 98 and 100 are pivotally secured to arms 130 and 132, fixed to shafts 134 and 136, which ride in slots 138 and 140, in plates 142 and 144, fixed in the machine framework. Rollers 146 and 148 on the arms 130 and 132 project into cam slots 150 and 152 in the plates 142 and 144.

The carrying frames for the No. 1 and No. 2 totalizer lines 20 and 22 are similar, and the frame for the No. 2 totalizer line 22 is partially shown in FIG. 3. The totalizers of the No. 2 line 22 are mounted free on a tube 154, carried by an arm 156 and a companion arm (not shown), slidably mounted on the shaft 136. The arm 156 has a slot 158, engaging one of two lugs (not shown), depending upon the position of the totalizers, to prevent the arm 156 and its companion arm from turning on the shaft 136. Connecting the arm 156 and its companion arm is a rod 160, which spaces the two arms a proper distance apart. The two arms mentioned, the rod 160, and the tube 154 form a frame which is slidable on the shaft 136 for the purpose of bringing any desired pinions of the totalizers of the No. 2 line 22 into engagement with the differential acutator 24 in a manner which is well known in the art and which is described in the United States Patent No. 1,394,256, to Frederick L. Fuller.

The mode of operation of the totalizer-engaging mechanism will now be briefly described. Adjustment of the selecting plate 26 is accomplished at the beginning of a balance pickup operation under conrtol of the solenoid L20. In the event that an "active" ledger card (that is, one on which check and/or deposit items are to be posted during the posting run) is fed into the accounting machine, the energizing circuit for the solenoid L20, which will be described subsequently, is not completed, and the solenoid is therefore not energized. The selecting plate 26 accordingly remains in the position in which it is shown in FIG. 4, with the notch 62 positioned out of the path of movement of the right end of the pawl 67, and with the notch 63 positioned in the path of movement of the left end of the pawl 69. In the event that an "inactive" card (that is, one on which no check or deposit items are to be posted during the posting run) is fed into the accounting machine, the energizing circuit of the solenoid L20 is completed, and the solenoid L20 energizes. This force acts through the linkage shown in FIG. 4 to rock the selecting plate 26 clockwise, as viewed in FIG. 4, so that the notch 62 in said plate is positioned in the path of movement of the right end of the pawl 67, while the notch 63 is positioned out of the path of movement of the left end of the pawl 69.

As previously stated, the selecting plate 28 is set according to the position of control row 2 of the accounting machine. During a balance pickup operation, control row 2 is automatically set either to its position "1" or to its position "9", depending upon whether the balance picked up from the ledger card is a minus balance or a plus balance, as is fully described in the previously mentioned United States Patent No. 2,947,475, to Konrad Rauch et al. The selecting plate 28 is correspondingly positioned, through the arm 58 and the link 60. Therefore, when a negative balance is picked up from the ledger card, the plate 28 is shifted from the "0" position, in which it is shown in FIG. 5, to a position in which a high portion of the periphery of the plate (indicated in FIG. 5 by a line denoted "1") is located in the path of movement of the left end of the pawl 67. The right end of said pawl, as will be described subsequently, does not sense the periphery of the plate 28. In the shifted position of the plate 28, a notch in the periphery of said plate (also indicated in FIG. 5 by a line denoted "1") is located in the path of movement of the left end of the pawl 69, while the right end of said pawl is located over a high portion of the periphery of the plate 28. Similarly, when a positive balance is picked up from the ledger card, the plate 28 is shifted from the "0" position, in which it is shown in FIG. 5, to a position in which a high portion of the periphery of the plate (indicated in FIG. 5 by a line denoted "9") is located in the path of movement of the left end of the pawl 67. In this position of the plate 28, a notch in the periphery of said plate (also indicated in FIG. 5 by a line denoted "9") is located in the path of movement of the left end of the pawl 69, while the right end of said pawl is located over a high portion of the periphery of the plate 28.

The left end of the pawl 67 is so constructed and arranged that it senses only the periphery of the plate 28, while the right end of said pawl is so constructed and arranged that it senses only the periphery of the plate 26. The right end of the pawl 69 is so constructed and arranged that it senses only the periphery of the plate 28, while the left end of the pawl 69 is of a double thickness and is constructed and arranged to sense the peripheries of both plate 26 and plate 28. It will accordingly be seen that, in order for the pawl 67 to be maintained in its outermost position with respect to the shaft 32 at the center of the plate 26, its left end must be positioned opposite a high portion of the plate 28, and its right end must be positioned opposite a high portion of the plate 26. In order for the pawl 69 to be maintained in its outermost position with respect to the center of the plates 26 and 28, its right end must be positioned opposite a high portion of the periphery of the plate 28, while its left end must be positioned opposite a high portion of the periphery of either the plate 26 or the plate 28.

After the plates 26 and 28 have been positioned in the manner described above, the cam 66 rocks the cam follower 113 clockwise to its former position. This moves the link 111 upward and rotates the bell-cranks 106 and 108 counter-clockwise and three-armed lever 114 clockwise, to their former positions. The movement of the bell-cranks 106 and 108 moves the pivots 103 and 105 toward the plates 26 and 28, and along with them the pawls 67 and 69. Where high spots on the plates 26 and 28 are located opposite both ends of the pawls 67 and 69, said pawls are held against inward movement, and their pivot points 107 and 109 form fulcrums for the levers 102 and 104, the outer ends of which move the studs 94 and 96 of the links 98 and 100 into engagement with the hooks 92 on the spider 90. Where low spots on the plates 26 and 28 are located opposite either end of the pawls 67 and 69, the ends of the pawls 67 and 69 move into the low spots on the plates 26 and 28, so that the studs 94 and 96 fail to engage the hooks 92 on the spider 90.

When the levers 102 and 104 have completed their movement just described, the cam 70 (FIG. 2) rotates the bell-crank 76 and the spider 90 clockwise, pulling with them either or both of the links 98 and 100, whose studs 94 and 96 are engaged with the hooks 92 on the spider 90. The opposite ends of the links 98 and 100 are pivoted to the arms 130 and 132, fastened to the shafts 134 and 136, and pull these shafts toward the differential actuators 24 (FIG. 3), at the same time rotating said shafts sufficiently to remove the aligners (not shown) which are engaged with the totalizer wheels. The totalizers of the totalizer lines 20 and 22, each being mounted on a frame which is in turn mounted on the shafts 134 and 136, as previously described, are moved into engagement with the differential actuators 24.

It will be seen that with the selecting plate 28 in position 1 or position 9, and with the selecting plate 26 shifted out of the position in which it is shown in FIG. 4, during the processing of an "inactive" account, the right end of the pawl 67 is moved into the notch 62 in the periphery of the plate 26, and the No. 1 totalizer line 20 accordingly is not engaged with the differential actuators 24. The left end of the pawl 69 engages a high portion of the periphery of the plate 26, and the right end of the pawl engages a high portion of the periphery of the plate 28. The No. 2 totalizer line 22 is therefore engaged with the differential actuators 24 during this operation of the accounting machine.

On the other hand, when an "active" account is processed, the plate 26 remains in the position in which it is shown in FIG. 4, while the plate 28 is set either to position 1 or to position 9. In this case, the left end of the pawl 67 engages a high portion of the periphery of the plate 28, while the right end of said pawl engages a high portion of the periphery of the plate 26, and the No. 1 totalizer line 20 is accordingly engaged with the differential actuators 24 during this operation. The right end of the pawl 69 engages a high portion of the periphery of the plate 28, but the left end of said pawl engages notches in both plates 26 and 28, thus preventing engagement of the No. 2 totalizer line 22 with the differential actuators 24 during this operation.

The totalizers of the No. 1 totalizer line 20 and the

No. 2 totalizer line 22 which have been engaged with the differential actuators 24 are disengaged from said actuators, at the end of operation, by a counter-clockwise movement of the spider 90, under control of the cam 68, which causes this disengaging movement to be commenced at approximately 320 degrees of rotation of the main drive shaft 64 and to be completed at 360 degrees of rotation of said shaft.

It will be seen that means have been described above which provide for engagement of the totalizers of the No. 1 totalizer line 20 with the differential actuators 24 when a ledger card for an "active" account is fed into the accounting machine, and which provide for engagement of the totalizers of the No. 2 totalizer line 22 with the differential actuators 24 when a ledger card for an "inactive" account is fed into the accounting machine.

*System circuitry*

The circuitry in which the present invention is embodied will now be described. Since this circuitry is associated with other circuitry utilized in the accounting machine, the ledger card feeder, and the tape reader, all of which form a part of the accounting system in which the present invention is embodied, only so much of the circuitry of the various components as relates to the present invention will be described herein. For a description of the remaining system circuitry, reference may be had to the previously-mentioned United States Patent No. 2,947,475, to Konrad Rauch et al., and to the United States patents applications Serial No. 770,673, of Henry Grosnickle, Jr., and William C. Arnold, and Serial No. 840,701, of William C. Arnold and Chester N. Jorgensen. Where necessary to the understanding of the system as a whole, certain portions of these previously-described operating circuits have been incorporated in the circuitry included in this application.

In the ensuing description, numerous references will appear to switches, the opening and closing of which are controlled by two different cam lines of the accounting machine; namely, the auxiliary cam line and the printer cam line. The construction of the accounting machine, as fully described in the previously-mentioned United States Patent No. 2,947,475, is such that the auxiliary cam line is operated at the beginning of accounting machine operation and goes from zero degrees to 180 degrees of rotation, at which time, during normal accounting machine operation, it halts. At 170 degrees of operation, it initiates a machine-operating sequence which causes the printer cam line to begin a cycle of operation. At 155 degrees of rotation of the printer cam line, the second 180 degrees of rotation of the auxiliary cam line is commenced, so that the auxiliary cam line is returned to home position during the same time that the printer cam line is being returned to its home position.

It is believed that the circuitry of the present invention may be described most clearly by an explanation of the manner in which it functions during certain operations of the system. Accordingly, it will be assumed at the beginning of this description that the system has been set to accomplish an automatic posting run, and has also been conditioned to accomplish an automatic trial balance of the group of accounts being posted, by operation of a manual switch which closes the contacts ST206B1 in FIG. 6. The sequence of operation which will now be described could take place during the balance pickup operation of the machine on any ledger card of the group. As is fully described in the previously-mentioned United States patent application Serial No. 770,673, the pickup of a ledger card is initiated by the ledger card feeder, which feeds the ledger card into the accounting machine and then signals the accounting machine to make a balance pickup operation on the card.

Let it also be assumed that the ledger card which is fed into the accounting machine during the balance pickup operation relates to an "inactive" account, so that there is no item entry of a check or a deposit on the tape being read by the tape reader component of the system which relates to the account carried on the ledger card. Consequently, there is no account identification data on the tape corresponding to the account identification data sensed from the ledger card, and the comparator relay K318 does not energized. The relay K318 is not shown herein, but said relay and its energizing circuitry are fully described and illustrated in the previously-mentioned United States patent application Serial No. 840,701. Accordingly, the relay contacts K318A5 (FIG. 6), controlled by the relay K318, remain open and prevent energization of the relay K273.

Also, the relay contacts K318A4 (FIG. 7), in the energizing circuit for the pawl check relay K106 in the ledger card feeder, remain open. Provision is made, however, for by-passing the relay contacts K318A4 by the contacts K274A12, as will be described subsequently.

The previously-described closing of the contacts ST206B1 is effective to complete an energizing circuit for the relay K274, said circuit extending from the terminal 162 over a common 164; the contacts ST206B1; the relay K274; and a common 166, to the terminal 168. A source of 90 volts D.C. power is applied to the terminals 162 and 168 and energizes the relay K274 upon completion of the circuit in the manner described above.

Energization of the relay K274 causes the contacts K274BC2 (FIG. 6) to open. These contacts are located in one path of the energizing circuit for the trip coils L201 of the tape reader. Since the relay contacts K273AC1, which are located in the other path of the energizing circuit for the coils L201, also remain open, due to the failure of the relay K273 to energize, as explained above, it will be seen from examination of FIG. 6 that no energizing path for the trip coils L201 of the tape reader is available, and operation of the reader is thus prevented during the operation of the accounting machine in connection with a ledger card pertaining to an "inactive" account.

The contacts K274AC2 close, in the holding circuit for the relay K273, but have no effect on the circuit at this time, since the holding contacts K273A2 are open.

The contacts K274A3 close, in the energizing circuit for a relay K309 (FIG. 8) of the accounting machine, by-passing the contacts K318A2 controlled by the comparator relay. At 145 degrees of rotation of the auxiliary cam line, on the insweep of the ledger card to the accounting machine, the contacts SC919 close and complete the energizing circuit for the relay K309, unless one or more various conditions relating to the correct pickup of information from the ledger card have not been met. The energizing circuit for the relay K309 extends from the terminal 170 over a common 172; contacts SC15A1; contacts K274A3; contacts SC1B1; contacts SC919; a series of contacts relating to various conditions which must be satisfactory for a machine operation to take place, and which are diagrammatically indicated in FIG. 8 by the contacts 178; the relay K309; and a common 174 to the terminal 176. A source of 115 volts, 60-cycle A.C. power is connected to the terminals 170 and 176 and serves to energize the relay K309. When the relay K309 energizes, the contacts K309A1 are closed to complete a holding circuit to maintain the relay K309 in energized condition until the contacts SC15A1 are subsequently opened.

The contacts SC15A1 perform a balance pickup control function, and close on a balance pickup operation when the line-finding solenoid (not shown) is energized. As previously mentioned, the contacts K318A2 are controlled by the comparator relay K318, and are closed when said relay is energized following a correct comparison of identification data from a ledger card and the tape. The contacts K274A3, as previously described, are controlled by the relay K274 and are closed when said relay is energized. The contacts SC1B1 are cyclically-operable contacts which are open in home position of the accounting machine, and which close at 135 degrees of rotation of the auxiliary cam line so long as no keys of the keyboard of the accounting machine are depressed, in order to permit a normal balance pickup operation. The contacts SC919, as previously described, are cyclically-operable contacts which close at 145 degrees of rotation of the auxiliary cam line and remain closed until 165 degrees of said rotation. The various contacts indicated generally by the diagrammatic showing of open contacts 178 relate to pawl check contacts which open in the event of an incorrect condition in the accounting machine, in order to prevent operation with spurious data. The relay K309 is the pawl check relay of the accounting machine and is energized on a balance pickup operation, as described above, in the event of proper operation of the latch stop pawls (not shown) of the accounting machine. Energization of the relay K309 causes the operation of several contacts in the conventional circuitry of the accounting machine, and also causes closure of the contacts K309A5 (FIG. 6) in the energizing circuit for the relay K273, so that, if the comparator contacts K318A5 in said circuit are also closed when a correct comparison takes place, the relay K273 is energized.

The key lock line (not shown) of the accounting machine is tripped to commence operation at approximately 170 degrees of rotation of the auxiliary cam line, and initiates a number of mechanical operating sequences in the accounting machine, including initiation of rotation of the printer cam line, as previously described. At 30 degrees of rotation of the printer cam line, the contacts SC955 in the energizing circuit for the solenoid L20 (FIG. 8) close, to complete said circuit and energize the solenoid L20. This circuit extends from the terminal 170, over the common 172; the contacts SC955; the contacts K274A14; the contacts K273B13; the solenoid L20; and the common 174 to the terminal 176.

The contacts SC955 close at 30 degrees of rotation of the printer cam line, as previously described, and remain closed until 350 degrees of rotation of said line. The contacts K274A14 are controlled by the relay K274, and close when said relay is energized. The contacts K273B13 are controlled by the relay K273 and remain closed unless said relay is energized. It will therefore be seen that energization of the relay K273 is effective to open the contacts K273B13 and prevent energization of the solenoid L20.

Operation of the solenoid L20 causes the selecting plate 26 (FIG. 4) to be shifted, in the manner previously described, from the position in which it is shown in FIG. 4 to its alternate position, to cause the No. 2 totalizer line 22 to be engaged with the differential actuators 24, while the No. 1 totalizer line 20 is maintained out of engagement with the differential actuators 24. The balance sensed from the ledger card by the accounting machine is thus caused to be placed directly in the trial balance total in the No. 2 totalizer line 22.

As the printer cam line and the auxiliary cam line rotate to home position at the conclusion of the balance pickup operation of the accounting machine, the contacts SC921A1 (FIG. 8) close at 350 degrees of rotation of the auxiliary cam line, and the contacts SC941A1 subsequently close at 345 degrees of rotation of the printer cam line. Both of these contacts are in the energizing circuit for the relay K302, and cause said circuit to be completed to energize said relay. The energizing circuit extends from the terminal 170 over the common 172; contacts SC941A; contacts K308AC4; contacts K312B1; contacts SC921A1; multiple position switch SR1A, which in a posting operation will be set to its "P" position, as shown in FIG. 8; contacts K274A2; contacts K273B12; the relay K302; and the common 174 to the terminal 176.

The contacts SC941A1 are cyclically-operable contacts, as previously described, and are closed between 345 degrees and 15 degrees of the rotation of the printer cam line. The contacts K308AC4 are controlled by the gate check relay K308 (not shown) of the accounting machine, and are closed by energization of that relay, which takes place unless a "gate check" condition exists, indicating incorrect pickup information from the ledger card. The contacts K312B1 are controlled by the table relay K312 (not shown), which is energized when the card-holding table of the accounting machine moves away from its home position during machine operation, so that the contacts K312B1 remain closed so long as the table of the accounting machine is in home position. The contacts SC929A1 are cyclically-operable contacts, as previously described, and are closed between 350 degrees and 15 degrees of the rotation of the auxiliary cam line. The switch SR1A is a five-position switch which is settable under the control of the function control knob (not shown) of the accounting machine, according to which of the various types of operations, that the accounting machine is capable of performing, is to be performed in a particular instance. It will be noted that in this case, since a posting run is to be accomplished by the accounting machine, the switch SR1A is set to its "P" position. It may also be noted that, when the switch is set to its "TB" position, a by-pass of the two contacts K274A2 and K273B12 is provided, so that, in a trial balance operation, these two contacts are unable to determine the control of the relay K302. The contacts K274A2 are controlled by the relay K274 and are closed when said relay is energized. The contacts K273B12 are controlled by the relay K273 and remain in closed condition so long as the relay K273 remains deenergized, as it is during the operation of the accounting machine when an "inactive" account is being processed.

The relay K302 is a sequence relay, which controls the sequence of operation of the accounting machine, and which must be energized in order to permit a balance pickup operation on the next subsequent machine operation. Energization of the relay K302 prepares the accounting machine to accept another ledger card from the ledger card feeder and to make a balance pickup operation upon the card, and the feeder is consequently conditioned to feed the next card to the accounting machine. It will be seen that when an "inactive" account is being processed by the machine, it is necessary to permit another balance pickup operation immediately following. On the other hand, when an "active" account is being processed, it is necessary to prevent a balance pickup operation immediately following the current balance pickup operation, since posting entries and a new balance operation must first be made in order to complete posting to that particular account. Accordingly, the sequence relay K302 is effective to control the sequence of the accounting machine, and in the present instance, in processing of an "inactive" account, must be energized in the manner described above.

As fully described in the previously-mentioned United States patent application Serial No. 770,673, the pawl check relay K106 functions to prevent erroneous operation of the apparatus, and is energized when certain error conditions arise. In the present invention, it is desired that the relay K106 be permitted to function when appropriate during the processing of a carding pertaining to an inactive account. Accordingly, the contacts K274A12, which are closed by energization of the relay K274, are included in the energizing circuit for the relay K106, which is located in the ledger card feeder. This circuit extends from a terminal 180 (FIG. 7) over a common 182; contacts K274A12, which are parallel with and by-pass the contacts K318A4 controlled by the comparator relay K318; contacts K108A1; and the relay K106 to a terminal 184. A source of 115 volts, 60-cycle A.C. power is applied to the terminals 180 and 184. As stated above, the contacts K318A4 are controlled by the comparator relay K318 and remain open until said comparator relay is energized. It is therefore seen that when an "inactive" card is processed by the accounting machine, the relay K106 cannot close unless the contacts K318A4 are by-passed, since no comparison takes place which would energize the relay K318. As has been described, this necessary by-passing function is accomplished by the contacts K274A12. The contacts K108A1 are controlled by the pawl check indication relay K108 (not shown) in the feeder, which is energized during an operation in which there is a failure of sensing of correct information. The pawl check relay K106 functions to control certain other circuitry in the ledger card feeder, as is fully explained in the previously-mentioned United States patent application Serial No. 770,673.

The relay K263, shown in FIG. 6, forms a part of the overdraft sorting control circuitry which is disclosed in the previously-mentioned United States patent application Serial No. 840,701. Broadly speaking, the function of the relay K263 is to terminate an overdraft sort condition which has been set up in the apparatus by an overdraft balance in an account. As is fully described in the above-mentioned United States patent application Serial No. 840,701, the relay K263 is energized by closing the contacts K103A3 under control of the relay K103 in the ledger card feeder control circuitry. Energization of the relay K263 is maintained by a holding circuit which is connected in parallel with the contacts K103A3, and which includes the contacts K263A1. In the United States patent application Serial No. 840,701, this holding circuit also includes cyclically-operable contacts SC943 of the accounting machine. In the present invention, the contacts SC943 have been removed from the holding circuit, and the contacts K273BC1 have been placed in series with the contacts K263A1 in the holding circuit. It will be seen that the holding circuit is therefore capable of functioning to maintain the relay K263 energized only so long as the relay K273 remains deenergized, as is the case when a ledger card pertaining to an "inactive" account is being processed by the accounting machine.

Let it now be assumed that the ledger card which is fed into the accounting machine during the balance pickup operation relates to an "active" account, so that there is at least one item entry of a check or a deposit on the tape being read by the tape reader component of the system which relates to the same account as that carried on the ledger card being processed by the accounting machine. There will accordingly be at least one posting entry on the tape which includes account identification data corresponding to the account identification data sensed from the ledger card. This correspondence of identification data is effective to cause energization of the comparator relay K318, in a manner which is fully described in the previously-mentioned United States patent application Serial No. 840,701.

The relays K274 and K309 are energized in the same manner, during the processing of an "active" account, as was described previously in connection with the processing of an "inactive" account.

Closing of the contacts K318A4, under control of the relay K318, which is energized in the case of processing of an "active" account, and closing of the contacts K309A5, which is effected by energization of the relay K309, complete an energizing circuit for the relay K273 which extends from the terminal 162 over the common 164; contacts K318A4; contacts K309A5; the relay K273; and the common 166 to the terminal 168.

Energization of the relay K273 causes the contacts K273A2 to close in a holding circuit for the relay K273. The contacts K274AC2 are also closed by energization of the relay K274, and the holding circuit is completed by closure of the contacts SC20A1, which close at 100 degrees of the rotation of the printer cam line during a balance pickup operation. The relay K273 is thus maintained in energized condition over this holding circuit until the contacts SC20A1 open during a subsequent new balance operation.

Energization of the relay K273 also causes the contacts K273BC1 (FIG. 6) to open, thereby breaking the holding circuit for the relay K263, and causing said relay to be deenergized in the event that it has previously been in an energized condition.

As previously described, the printer cam line commences its cycle of rotation as the auxiliary cam line reaches 170 degrees of its cycle. In this case of processing an active account, the solenoid L20 is not energized, since energization of the relay K273 has opened the contacts K273B13 in the energizing circuit for the solenoid L20. Accordingly, the selecting plate 26 is maintained in the position in which it is shown in FIG. 4, and the balance sensed from the ledger card is entered into the totalizers of the No. 1 totalizer line 20. The subsequent check and/or deposit item entries are also entered into this totalizer, after which the total is transferred to the trial balance totalizers of the No. 2 totalizer line 22 during a new balance operation of the accounting machine.

As the printer cam line and the auxiliary cam line return to home position at the conclusion of the balance pickup operation, the relay K302 does not energize, since its circuit is interrupted by the open contacts K273B12, which are opened by energization of the relay K273. This prevents release of the account ledger card by the accounting machine, and also prevents feeding of another card to the accounting machine by the card feeder.

At 320 degrees of the cycle of rotation of the auxiliary cam line, the relay K309 is deenergized. The comparator relay K318 remains energized, however.

Energization of the relay K273 closes the contacts K273AC1 in the energizing circuit for the tape reader trip coils L201 (FIG. 6), thereby by-passing the series combination of the contacts SC20A1 and the contacts K274BC2. This prepares an energizing circuit for the coils L201 which extends from the terminal 162 over the common 164 contacts K273AC1; contacts SC945; contacts ST250B2; one of three parallel branches in which a first branch includes serially-connected contacts SP274A1 and K272B2, a second branch includes contacts K271A13, and a third branch includes contacts K281A11; contacts K280B2; contacts K251B11; contacts SC212; contacts SC250; contacts SC209; the trip coils L201; and the common 166 to the terminal 168.

At 350 degrees of rotation of the printer cam line, the contacts SC945 close, completing the energizing circuit for the trip coils L201. The functioning and the control of the various contacts in this circuit, except for the contacts K273AC1 and K274BC2, have been fully described in the previously-mentioned United States patent application Serial No. 840,701, and reference may be had thereto for a complete explanation.

The contacts K273A1 are effective to control the operation of the trip coils L201, whenever the accounting machine, the tape reader, and the card feeder are conditioned to perform an automatic trial balance operation while posting, by closing of the manually-operable contacts ST206B1 to energize the relay K274. In such case, the contacts K274BC2 are opened by energization of the relay K274, thus removing the control of the energizing circuit for the coils L201 from the contacts SC20A1. The coils L201 therefore cannot be energized during processing of an "inactive" account, during which time the contacts K273A1 are open, since in such case no information is supplied from the tape. However, the coils L201 must be energized during processing of an "active" account, during which time the contacts K273A1 are closed, since, in such case, item information, such as checks and deposits, is sensed from the tape and transmitted to the accounting machine to effect posting on the account. After all items pertaining to the account have been posted, a new balance operation is initiated in the manner described in the previously-mentioned United States patent application Serial No. 840,701.

At 100 degrees of rotation of the printer cam line during a new balance operation, the contacts SC20A1 in the holding circuit for the relay K273 open, and said relay is thus deenergized. This is effective to reset the operating circuitry to its original condition in preparation for the next account to be processed.

Control of the energizing circuit for the coils L201 is restored to the contacts SC20A1 whenever the manually-operable contacts ST206B1 are opened to take the machine out of its automatic trial balance condition. Opening of these contacts deenergizes the relay K274, causing the contacts K274BC2, in the energizing circuit for the coils L201, to close.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a machine of the class described, constructed and arranged to perform automatic posting operations on a group of accounts, with the old balance and associated identification data being carried on one record medium and individual item data and associated identification data being carried on a second record medium, and including first entry means to enter data from the first record medium into the machine, second data entry means to enter data from the second record medium into the machine, and means to compare the identification data from the two record media to relate the individual item data to the proper accounts, the combination comprising first totalizer means on which a trial balance of all accounts in the group is accumulated; second totalizer means on which balance totals for individual accounts to which item entries are made are accumulated; entry means for entering amounts into the first and second totalizer means; engaging means for selectively engaging the first and second totalizer means with the entry means; totalizer-selecting means to determine the operation of the engaging means; sensing means operable to sense the totalizer-selecting means and to cause operation of the engaging means in accordance therewith; shifting means operable to shift the totalizer-selecting means; manually controlled means for conditioning the shifting means for operation; first operating means capable of preventing operation of the shifting means when there is agreement of identification data sensed from the first and second record media; second operating means capable of conditioning the second data entry means for further operation when there is agreement of identification data sensed from the first and second record media; and control means responsive to the comparison of identification data from the two record media for controlling the operation of the first and second operating means.

2. In a machine of the class described, constructed and arranged to perform automatic posting operations on a group of accounts, with old balance and associated identification data being carried on a first record medium and individual item data and associated identification data being carried on a second record medium, and including first data entry means to enter data from the first record medium into the machine, second data entry means to enter data from the second record medium into the machine, and means to compare the identification data from the two record media to relate the individual item data to the proper accounts, the combination comprising first totalizer means on which a trial balance of all accounts in the group is accumulated; second totalizer means on which balance totals for individual accounts to which item entries are made are accumulated; entry means for entering amounts into the first and second totalizer means; engaging means for selectively engaging the first and second totalizer means with the entry means; totalizer-selecting means to determine the operation of the engaging means; sensing means operable to sense the totalizer-selecting means and to cause operation of the engaging means in accordance therewith; shifting means operable to shift the totalizer-selecting means; first operating means capable of preventing operation of the shifting means when there is agreement of identification data sensed from the first and second record media; second operating means capable of conditioning the second data entry means for further operation when there is agreement of identification data sensed from the first and second record media; and control means responsive to the comparison of identification data from the two record media for controlling the operation of the first and second operating means.

3. In a machine of the class described, constructed and arranged to perform automatic posting operations on a group of accounts, with old balance and associated identification data being carried on a first record medium and individual item data and associated identification data being carried on a second record medium, and including first data entry means to enter data from the first record medium into the machine, second data entry means to enter data from the second record medium into the machine, and means to compare the identification data from the two record media to relate the individual item data to the proper accounts, the combination comprising first totalizer means on which a trial balance of all accounts in the group is accumulated; second totalizer means on which balance totals for individual accounts to which item entries are made are accumulated; entry means for entering amounts into the first and second totalizer means; engaging means for selectively engaging the first and second totalizer means with the entry means; totalizer-selecting means to determine the operation of the engaging means; sensing means operable to sense the totalizer-selecting means and to cause operation of the engaging means in accordance therewith; shifting means operable to shift the totalizer-selecting means; operating means capable of preventing operation of the shifting means when there is agreement of identification data sensed from the first and second record media; and control means responsive to the comparison of identification data from the two record media for controlling the operation of the operating means.

4. In a machine of the class described, constructed and arranged to perform automatic posting operations on a group of accounts, with the old balance and associated identification data being carried on one record medium and individual item data and associated identification data being carried on another record medium, and including means to enter data from the two record media into the machine and means to compare the identification data from the two record media to relate the individual item data to the proper accounts, the combination comprising first totalizer means on which a trial balance of all accounts in the group is accumulated; second totalizer means on which balance totals for individual accounts to which item entries are made are accumulated; entry means for entering amounts into the first and second totalizer means; engaging means for selectively engaging the first and second totalizer means with the entry means; control means settable to determine the operation of the engaging means; sensing means operable to sense the control means and to cause operation of the engaging means in accordance therewith; shifting means operable to shift the control means; and means responsive to the comparison of identification data from the two record media for operating the shifting means when there is no agreement of identification data to set the control means so that the engaging means is effective to engage the first totalizer means with the entry means.

5. In a machine of the class described, constructed and arranged to perform automatic posting operations on a group of accounts, with the old balance and associated identification data being carried on one record medium, and individual item data and associated indentification data being carried on another record medium, and including means to enter data from the two record media into the machine and means to compare the identification data from the two record media to relate the individual item data to the proper accounts, the combination comprising first totalizer means on which a trial balance of all the accounts in the group is accumulated; second totalizer means on which balance totals for individual accounts to which item entries are made are accumulated; entry means for entering amounts into the first and second totalizer means; engaging means for selectively engaging the first and second totalizer means with the entry means; control means for controlling the engaging means to determine which totalizer means is engaged with the entry means; setting means for setting the control means in one of two positions; and means responsive to the comparison of identification data from the two record media for operating the setting means when there is no agreement of identification data to set the control means so that the engaging means is effective to engage the first totalizer means with the entry means.

6. In a machine of the class described, constructed and arranged to perform automatic posting operations on a group of accounts, with the old balance and associated identification data being carried on one record medium, and individual item data and associated identification data being carried on another record medium, and including means to enter data from the two record media into the machine and means to compare the identification data from the two record media to relate the individual item data to the proper accounts, the combination comprising first totalizer means on which a trial balance of all the accounts in the group is accumulated; second totalizer means on which balance totals for individual accounts to which item entries are made are accumulated; entry means for entering amounts into the first and second totalizer means; engaging means for selectively engaging the first and second totalizer means with the entry means; control means settable to determine the operation of the engaging means; sensing means operable to sense the control and to cause operation of the engaging means in accordance therewith; and means responsive to the comparison of identification data from the two record media for setting the control means in accordance with whether or not the identification data from the two record media agree, to thus cause engagement of the desired totalizer means with the entry means.

7. In a machine of the class described, constructed and arranged to perform automatic posting operations on a group of accounts, with the old balance and associated identification data being carried on one record medium, and individual item data and associated identification data being carried on another record medium, and including means to enter data from the two record media into the machine and means to compare the identification data from the two record media to relate the individual item data to the proper accounts, the combination comprising first totalizer means on which a trial balance total of all accounts in the group is accumulated; second totalizer means on which balance totals for individual accounts to which item entries are made are accumulated; entry means for entering amounts into the first and second totalizer means; engaging means for selectively engaging the first and second totalizer means with the entry means; control for controlling the engageing means to determine which totalizer means is engaged with the entry means; and means responsive to the comparison of identification data from the two record media for setting the control means in accordance with whether or not the identification data from the two record media agree.

References Cited by the Examiner
UNITED STATES PATENTS

| | | | |
|---|---|---|---|
| 1,808,432 | 6/31 | Peirce | 235—61.7 |
| 1,862,032 | 6/32 | Peirce | 235—61.7 |
| 2,493,858 | 1/50 | Carroll et al. | 235—61.8 |

MALCOLM A. MORRISON, *Primary Examiner.*

WALTER W. BURNS, JR., DRAYL W. COOK,
*Examiners.*